No. 778,810. PATENTED DEC. 27, 1904.
T. L. & T. J. STURTEVANT.
MOTOR VEHICLE.
APPLICATION FILED MAY 12, 1904.
3 SHEETS—SHEET 3.
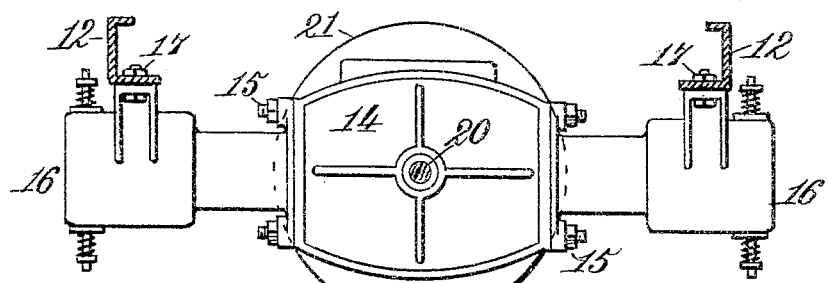
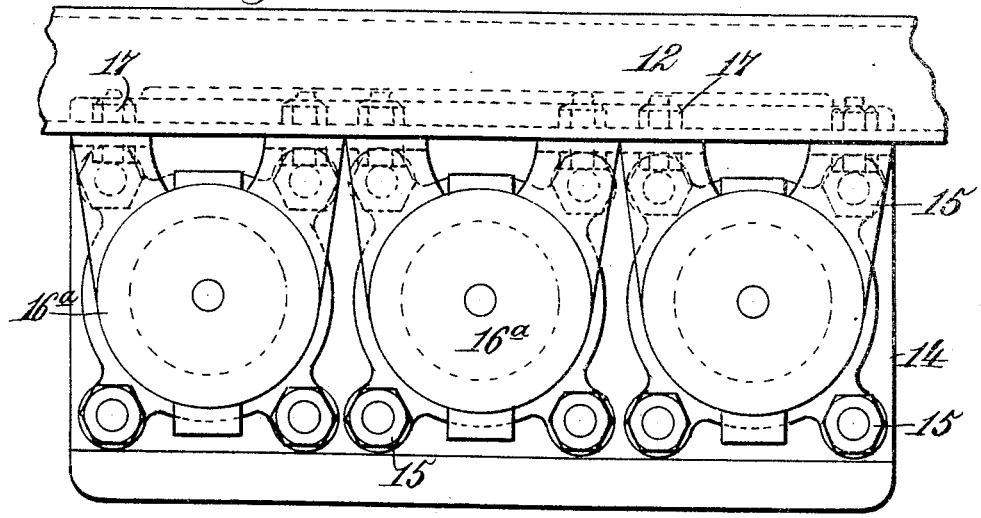
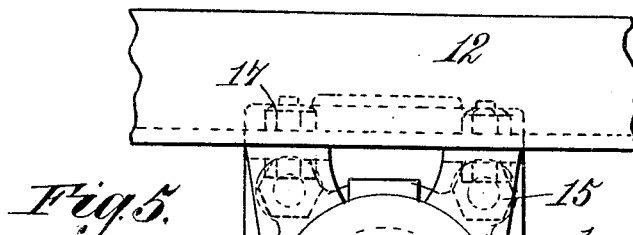

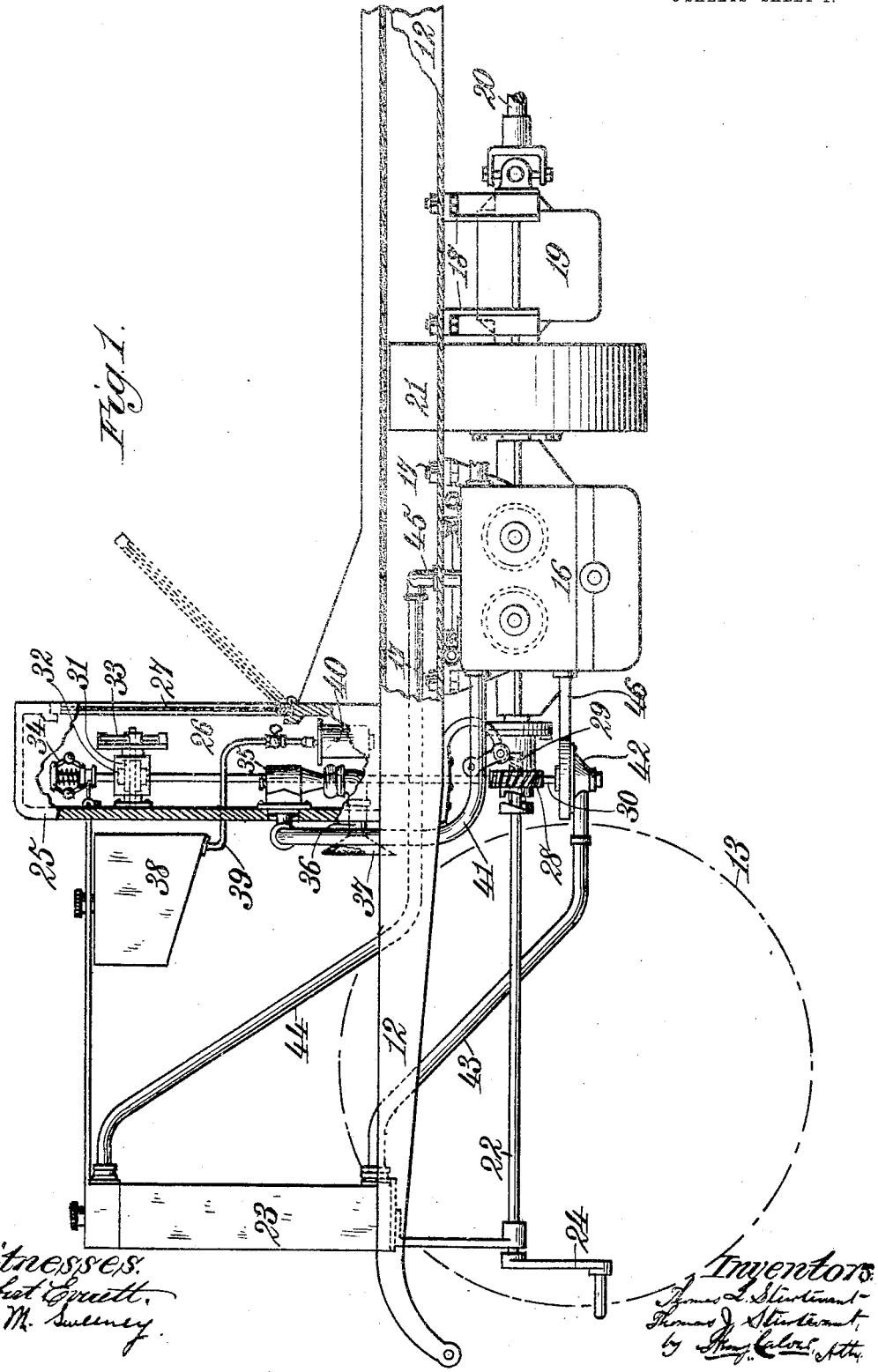

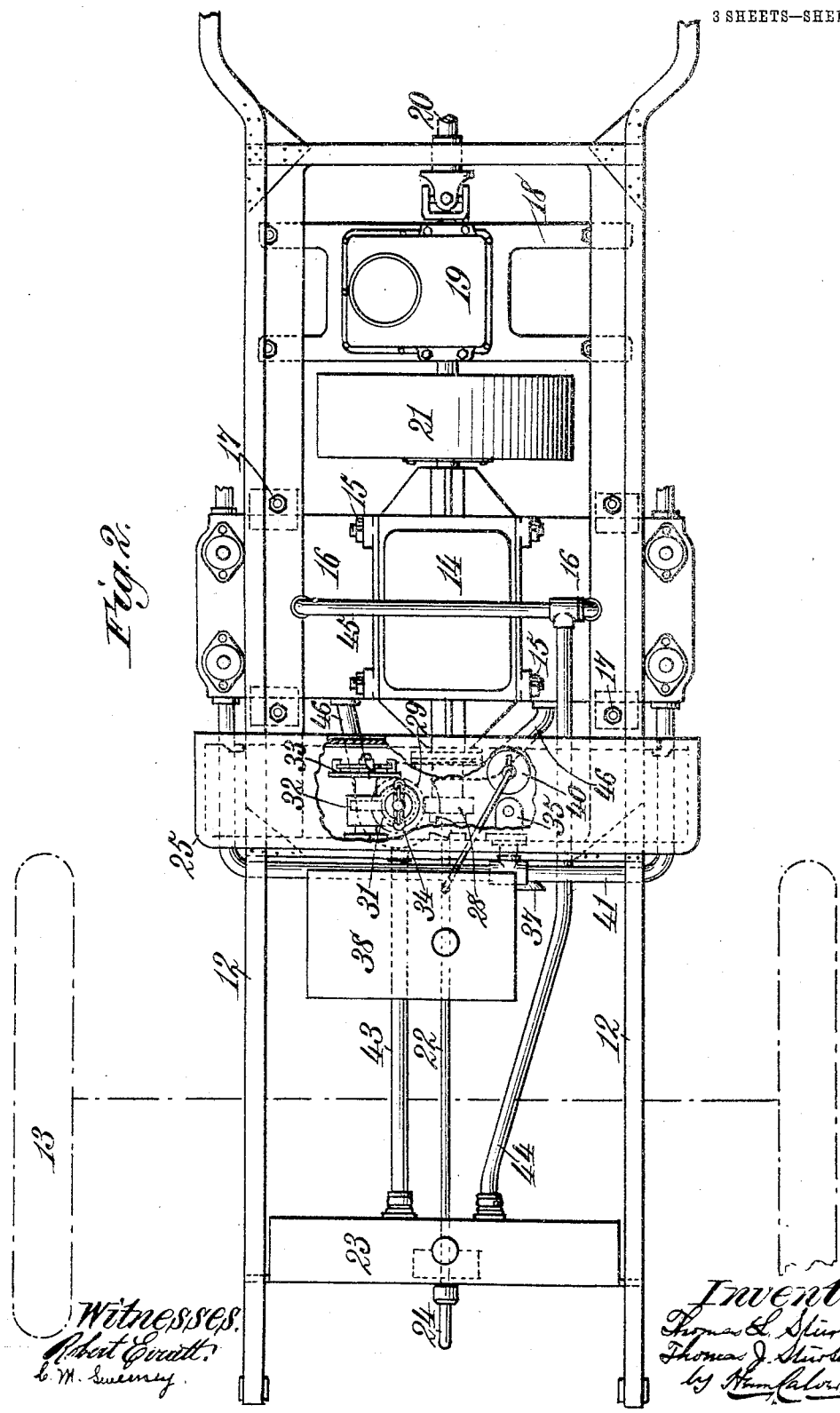

No. 778,810.

Patented December 27, 1904.

UNITED STATES PATENT OFFICE.

THOMAS LEGGETT STURTEVANT, OF QUINCY, AND THOMAS J. STURTEVANT, OF WELLESLEY, MASSACHUSETTS.

MOTOR-VEHICLE.

SPECIFICATION forming part of Letters Patent No. 778,810, dated December 27, 1904.

Application filed May 12, 1904. Serial No. 207,629.

*To all whom it may concern:*

Be it known that we, THOMAS LEGGETT STURTEVANT, residing at Quincy, and THOMAS J. STURTEVANT, residing at Wellesley, in the county of Norfolk and State of Massachusetts, citizens of the United States, have invented certain new and useful Improvements in Motor-Vehicles or Automobiles, of which the following is a specification, reference being had therein to the accompanying drawings.

This invention relates to automobiles or motor-vehicles, and has for its object to provide such a construction and arrangement of parts entering into or mounted on the chassis or running-gear of the vehicle as will combine the greatest convenience with the highest efficiency, both with reference to the machine when in use as also with regard to convenience in assembling or dismounting parts of the engine.

In the accompanying drawings, Figure 1 is a side view of the forward part of the chassis or running-gear of an automobile involving the present invention. Fig. 2 is a plan view of the same. Fig. 3 is a side view of the engine, showing the manner of supporting the same on the side bars of the vehicle which are represented in cross-section, the lower valve-casing shown in Fig. 2 being omitted from Fig. 3. Figs. 4 and 5 are detail end views illustrating modified forms of engine-cylinders and the manner of mounting the same.

Referring to the drawings, 12 denotes the side bars or side beams of the chassis or running-gear frame of the vehicle and which, as will be seen from Fig. 2, are bent toward each other in forming the forward part of the vehicle-frame for the purpose of giving a better clearance for the forward wheels 13 of the vehicle, to enable sharp turns to be made, as also for the purpose of so mounting a transversely-arranged opposed-cylinder engine in such a manner that the cylinder portions of the engine-frame will project laterally on each side of the vehicle-frame a sufficient distance to permit of ready access to the valve mechanisms and sparking plugs of the engine for the purpose of adjustment or repairs.

The vehicle herein shown is provided with an explosion or gas engine, although the invention is not to be understood as being limited to any particular form of engine.

The engine-frame herein shown comprises a crank-case 14, to the opposite ends of which are attached, by bolts and nuts 15, the cylinder-casings 16, which are secured beneath the side bars 12 of the vehicle-frame by bolts and nuts 17. The engine frame or case as a whole thus constitutes a cross-bar which will brace and strengthen the forward part of the vehicle-frame transversely, and the location of the engine-frame beneath the vehicle-frame locates the weight of the engine low down on the vehicle, so as to afford a low center of gravity, and thereby contributes to the steadiness of the vehicle when in motion. Owing to the construction and arrangement of parts just described, a cylinder-casing 16 at either end of the engine may readily be dismounted for cleaning or repairs without disturbing the cylinder-casing at the other end of the engine, it only being necessary when a single-unit cylinder-casing at one end of the engine is to be removed to properly block up the crank-casing and then loosen the cylinder-casing from its supports on the crank-casing and the vehicle-frame.

In the form of the invention shown in Figs. 1 and 2 each cylinder-casing 16 is a double one, comprising two of the cylinders of a four-cylinder engine; but for many reasons it may be better to make the casing for each cylinder separate from or independent of the casing of the other cylinder or cylinders.

Fig. 4 represents the cylinder-casings $16^a$ of a six-cylinder engine as being made separate from each other and separately bolted to a side bar of the vehicle-frame and to the crank-casing of the engine, while Fig. 5 represents a single cylinder $16^b$ of a two-cylinder engine to be bolted to the crank-casing of the engine-frame and to a side bar of the vehicle-frame.

In either of the forms of the invention shown each cylinder-casing, whether single or double, forms a cylinder-casing unit independently attachable or dismountable.

Bolted to the side bars 12 of the vehicle-frame, rearward of the engine-frame, is a cross-bar 18, which supports the change-gear box or casing 19, and between the said chang-gear box and the engine-frame, on the engine-shaft 20, which runs lengthwise of the machine, is a fly-wheel 21, within which is inclosed a centrifugal clutch power-transmitting device which will preferably be of the construction fully shown and described in our United States application, Serial No. 187,822, filed January 5, 1904; but the specific construction of which, forming no part of the present invention, need not be herein illustrated or described. The engine-shaft 20 may be geared directly to the rear or driving axle of the vehicle or may be connected with the rear driving-wheels in any other suitable manner, as by chain-gearing.

The vehicle is provided with a starting-shaft 22, provided at the front of the vehicle, and in front of the cooler 23 with a starting-handle 24.

From the foregoing it will be seen that the engine-frame forms a part of the vehicle-frame, strengthening the same transversely, and that the vehicle-frame combines with the engine-frame in such a manner that the side bars of the vehicle-frame serve to brace the engine-frame endwise of the latter.

The dashboard or dasher 25 of the vehicle is made hollow, so as to form an inclosed chamber 26, in which are conveniently located many of the necessary parts of the motor-vehicle, the said chamber being preferably formed by permanent front, top, and sides, but having an opening at its rear, or on the side thereof toward the driver of the vehicle, a transparent door 27, through which the parts located in the chamber of the dasher may be observed and which may be readily opened for access to the dasher-chamber. The parts inclosed within the dasher-space are well protected from the weather and dust. The engine-shaft is provided at its forward end with a worm-wheel 28, meshing with a worm-wheel 29 on a vertical shaft 30, which extends upward into the dasher-chamber, where it is provided with a second worm-wheel 31, meshing with a worm gear-wheel 32, which drives the sparker 33, said shaft being preferably provided at its top with a centrifugal governor 34. Within the dasher-chamber may be located gages to show water, oil, or gasolene levels, as also a sight-feed oil-pump and other parts, all of which may be readily observed by the driver through the glass door of the dasher. Also within the dasher-chamber is preferably located the carbureter 35, having an air-inlet pipe 36, provided with a funnel 37, and which carbureter is supplied with gasolene or other liquid hydrocarbon from a gasolene-tank 38, connected by a pipe 39 with a reservoir 40, suitably connected with the carbureter. With the egress or outlet pipe of the carbureter are connected suitable pipes 41 to convey gaseous fuel to the engine. A centrifugal pump 42, located at the lower end of and driven from the vertical shaft 30, is provided for the purpose of keeping up a proper circulation of water, said pump being connected with the cooler 23 by a pipe 43 and the water from the cooler being caused to return to the jackets of the engine-cylinders through pipes 44 and 45, forming part of the water-circulating system, the water-jackets of the engine-cylinders being connected with the said pump by pipes 46. We do not, however, herein claim this feature of the inclosed dashboard or dasher and the other features mounted thereon inclosed therein or directly coöperating therewith, as this part of our invention is claimed in our application, Serial No. 215,460, filed July 6, 1904, as a division of this application.

The invention is not to be understood as being limited to the details of construction herein shown and described, as these may be varied widely without departing from the spirit of the invention.

Having thus described our invention, we claim and desire to secure by Letters Patent—

1. In an automobile, the combination with a vehicle-frame comprising side bars, of an opposed-cylinder-engine frame arranged transversely to the vehicle-frame, and hung by its cylinder portions from the under sides of the said side bars, thereby bracing the vehicle-frame transversely and so mounting the engine as to give it a low center of gravity.

2. In an automobile, the combination with a vehicle-frame comprising side bars bent inward toward each other to make the front part of the frame narrower than the rear part thereof, of an opposed-cylinder-engine frame arranged transversely to the vehicle-frame and hung by its cylinder portions from the under sides of the said side bars, thereby bracing the vehicle-frame transversely and so mounting the engine as to give it a low center of gravity.

3. In an automobile, the combination with a vehicle-frame comprising side bars bent inward toward each other to make the front part of the frame narrower than the rear part thereof, of an opposed-cylinder-engine frame arranged transversely to the vehicle-frame and hung from the under sides of the said side bars, thereby bracing the vehicle-frame transversely and so mounting the engine as to give it a low center of gravity, said engine-frame projecting laterally on both sides of the said side bars so as to give ready access to the cylinder-casings of the engine.

4. In an automobile, the combination with a vehicle-frame comprising side bars, of an opposed-cylinder-engine frame comprising a central or crank-casing part and end or cylinder-casing parts, the said cylinder-casing parts being secured to the crank-casing part, and also to the under sides of the said side bars, whereby a cylinder-casing at one end of the engine may be removed without disturbing the remaining portions of the engine-frame or another cylinder-casing.

5. In an automobile, the combination with a vehicle-frame comprising side bars, of an engine-frame arranged crosswise of the vehicle-frame and secured to the under sides of the said side bars, a change-gear-box support at a distance from said engine-frame and also arranged crosswise of the vehicle-frame and bolted to said side bars, whereby the vehicle-frame is strengthened transversely at separated points by the engine-frame and the change-gear-box support.

6. In an automobile, the combination with a vehicle-frame comprising side bars, of an engine-frame placed crosswise of the vehicle-frame and supported by said side bars, a driving-shaft extending longitudinally of the vehicle-frame, a centrifugal clutch device on said driving-shaft rearward of the engine-frame and a change-gear box supported by the vehicle-frame rearward of the said centrifugal clutch device.

7. In an automobile, the combination with a vehicle-frame comprising side bars, of an engine-frame arranged crosswise of the said vehicle-frame and comprising a central portion or crank-casing, and cylinder-casing units attached to said crank-casing and side bars, and each of which cylinder-casing units is capable of independent removal from the vehicle-frame without disturbing or removing any other cylinder-casing unit.

8. In an automobile, the combination with a vehicle-frame comprising side bars, of an engine-frame arranged crosswise of the said vehicle-frame and comprising a central portion or crank-casing, and cylinder-casing units attached to said crank-casing and side bars, and each of which cylinder-casing units is capable of independent removal from the vehicle-frame without disturbing or removing any other cylinder-casing unit, the cylinder-casing units on each side of the vehicle-frame projecting laterally outside of the said side bars.

In testimony whereof we affix our signatures in presence of two witnesses.

THOMAS LEGGETT STURTEVANT.
THOMAS J. STURTEVANT.

Witnesses:
W. F. ELLIS,
RUBERT M. GAY.